United States Patent [19]

Takemura

[11] 3,777,061

[45] Dec. 4, 1973

[54] SOLID STATE IMAGE PICKUP DEVICE

[75] Inventor: Yasuo Takemura, Kawasaki, Japan

[73] Assignee: Tokyo Shibaura Electric Co., Ltd., Kawasaki-shi, Japan

[22] Filed: Oct. 11, 1972

[21] Appl. No.: 296,596

[30] Foreign Application Priority Data

Oct. 15, 1971 Japan .............................. 46/81433

[52] U.S. Cl. .......... 178/5.4 R, 178/7.1, 307/221 D, 317/235 R

[51] Int. Cl. .......................... H04n 9/04, H04n 5/30

[58] Field of Search .......................... 178/5.4 R, 7.1

[56] References Cited

OTHER PUBLICATIONS

"The New Concept for Memory and Imaging: Charge Coupling" L. Altman, Electronics June 21, 1971, pp. 50–59.

*Primary Examiner*—Howard W. Britton
*Assistant Examiner*—George G. Stellar
*Attorney*—Robert D. Flynn et al.

[57] ABSTRACT

An image pickup device of solid state semiconductor which comprises an image pickup section including frame scanning means for shifting carriers corresponding to picture elements of an optical image in a longitudinal direction for each row of matrix arrangement of carriers, the carriers being stored in potential wells of the same arrangement induced in a semiconductor substrate by using the principle of the charge coupled device; first and second readout storage sections constructed with the same arrangement as the image pickup section and disposed on the portions of the semiconductor substrate longitudinally extending from the opposite sides of image pickup section; and first and second line scanning means for reading out the carriers of each row of the first and second storage sections respectively in the form of electrical signals.

5 Claims, 10 Drawing Figures

SOLID STATE IMAGE PICKUP DEVICE

BACKGROUND OF THE INVENTION

This invention relates to improvements in an image pickup device of solid state semiconductor using the principle of the charge coupled device.

The charge coupled device (hereinafter referred to as "CCD") has an insulation layer of, for example, silicon dioxide $SiO_2$ formed on one side of a semiconductor substrate and a plurality of electrodes mounted on said insulation layer, thereby causing a plurality of potential wells to be induced when said electrodes are impressed with voltages of different amplitudes according to the prescribed method. Where the semiconductor substrate is illuminated by light, for example, an optical image, the respective potential wells are stored with an amount of charge proportionate to the intensity of light beams representing the picture elements of said optical image. Next where the electrodes are impressed with voltages having the prescribed different amplitudes in the order conforming with the established method, the charges thus stored can be shifted in a direction through an adjacent potential wells.

The known image pickup device of solid state semiconductor includes an image pickup section constituted by the principle of the C.C.D., a storage section formed at one longitudinal end of the image pickup section with the same arrangement thereof and scanning means disposed adjacent to the storage section so as to draw out the charges stored in the potential wells of the storage section successively in the form of electric signals.

However, the prior art image pickup device of the abovementioned arrangement fails to cause electric signals corresponding to a plurality of optical images to be generated at the same time. Namely, the conventional image pickup device using the C.C.D. principle has the noticeable drawback that it fails to produce, for example, a plurality of television signals simultaneously.

It is accordingly the object of this invention to provide an image pickup device of solid state semiconductor capable of obtaining electric signals representing a plurality of optical images at the same time or in parallel.

SUMMARY OF THE INVENTION

An image pickup device of solid state semiconductor according to this invention comprises an image pickup section disposed at the center of a semiconductor substrate; first and second readout storage sections constructed with the same arrangement as the image pickup section and disposed on the portions of the semiconductor substrate longitudinally extending from the opposite sides of the image pickup section; and means provided adjacent to the respective readout storage sections so as to draw out electric signals. In the image pickup section are induced in matrix form a plurality of potential wells, which are stored with charges corresponding to the picture elements of an optical image projected on the image pickup section. Said stored charges or carriers are simultaneously shifted for each row of picture elements in the longitudinal direction, so as to be shifted to either of said readout storage sections. Said shifting is hereinafter referred to as "frame scanning." Said first and second readout storage sections have positions related to the image pickup section so as to store in the potential wells the carriers shifted from the image pickup section for each row of picture elements. The means for generating electric signals also have positions related to the readout storage sections so as to shift the carriers shifted in the longitudinal direction for each row of picture elements now in the lateral direction for the respective potential wells, thereby successively drawing out said carriers in the form of electric signals, said shifting being hereinafter referred to as "line scanning."

The image pickup device of this invention enables charged images corresponding to first and second optical images obtained by the image pickup section to be stored in the first and second storage sections respectively. Accordingly, electric signals corresponding to the first and second optical images can be drawn out from said first and second readout storage sections either in parallel or in time sequence, thus eliminating the difficulties which have occurred with the prior art image pickup device in attaining the desired superposition of electric signals.

DETAILED DESCRIPTION OF THE INVENTION

Figures 1, 3, 4:
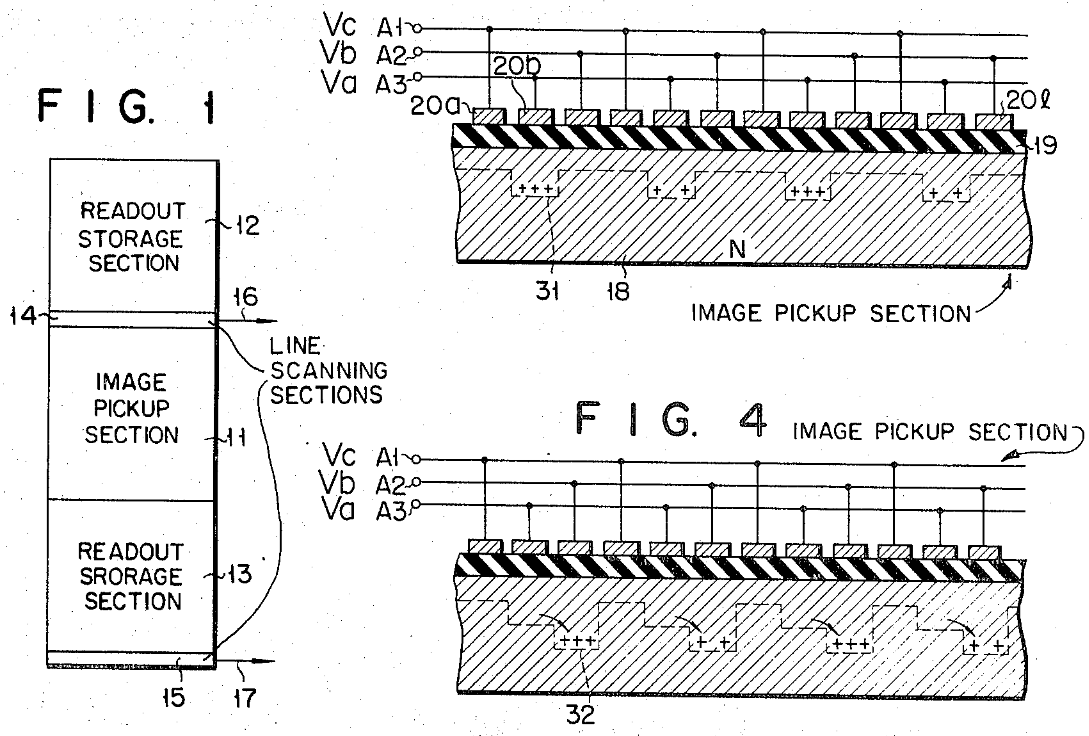
FIG. 1 is an enlarged plan view of the image pickup device of this invention, showing the relative positions of the image pickup section, two readout storage sections and two line scanning sections.
FIG. 3 is an enlarged sectional view on line 3—3 of FIG. 2.
FIG. 4 illustrates the manner in which there are shifted carriers from the potential wells shown in FIG. 3.

Referring to FIG. 1, there are formed, for example, on an N type semiconductor substrate an image pickup section 11, a first readout storage section 12 adjacent to one longitudinal end of the image pickup section 11, a second readout storage section 13 adjacent to the opposite end of the image pickup section 11 and first and second line scanning sections 14 and 15 disposed in the first and second readout storage sections respectively. In the image pickup section 11 are induced a plurality of potential wells in matrix form, which, when a first optical image is projected on the image pickup section 11, are stored with carriers corresponding to the picture elements of said optical image. When the image pickup section is subjected to frame scanning, the carriers are simultaneously shifted for each row of picture elements to the first readout storage section 12 to be stored therein. The carriers generated when a second optical image is projected on the image pickup section 11 are subjected to similar frame scanning and shifted to the second readout storage section 13 to be stored therein. The carriers now stored in the first and second readout storage sections 12 and 13 are subjected to line scanning by line scanning sections 14 and 15 respectively so as to be converted to output electric signals 16 and 17, which in turn are drawn out simultaneously or in time sequence as desired.

Figure 2:
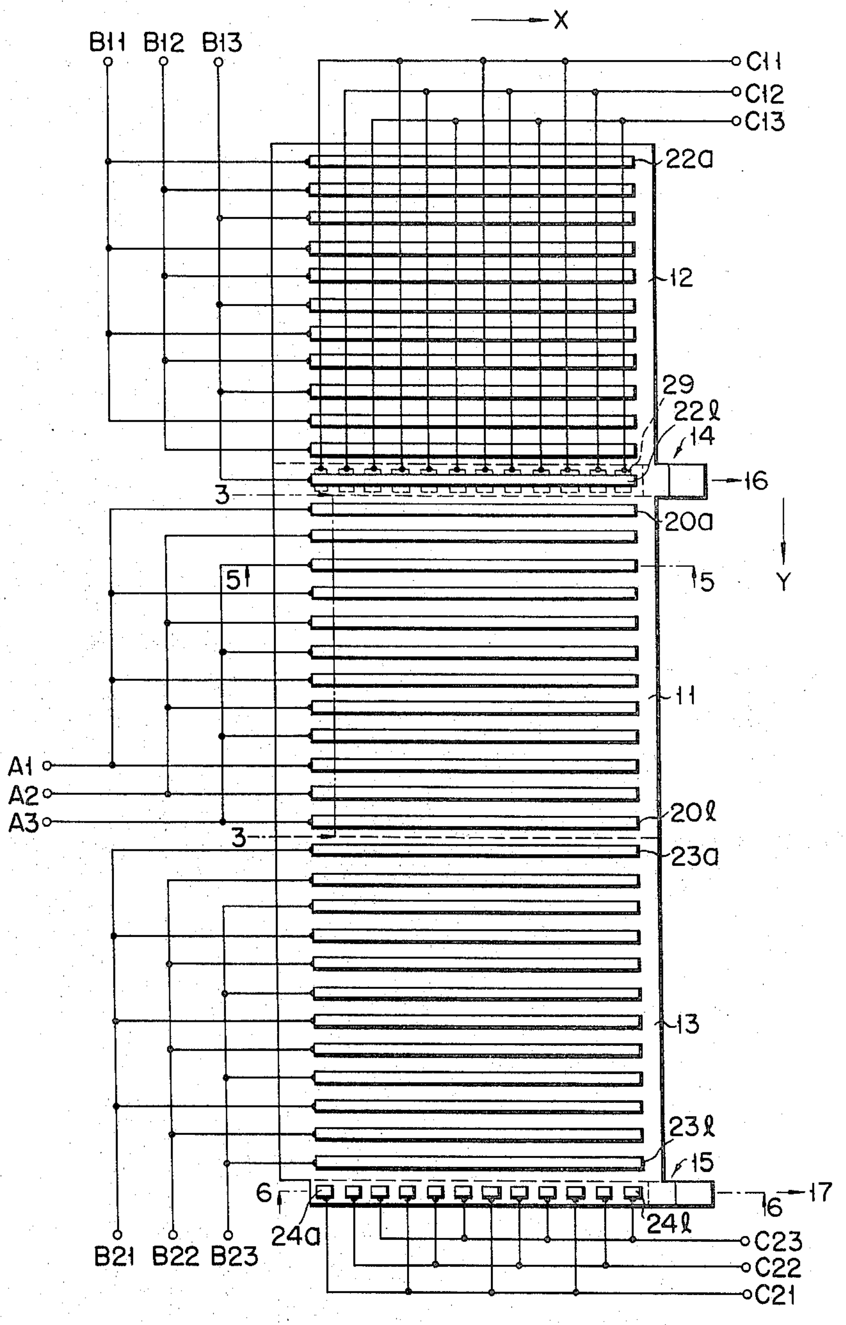
FIG. 2 is an enlarged plan view corresponding to FIG. 1, indicating the arrangement of electrodes and wires according to an embodiment of the invention.

The elements of FIG. 2 the same as those of FIG. 1 are denoted by the same numerals. As seen from the sectional view of FIG. 3 on line 3—3 of FIG. 2, the image pickup section comprises an insulation layer 19, for example, of silicon dioxide $SiO_2$ deposited all over the upper surface of an N type semiconductor substrate; a plurality of extremely fine electrodes 20 (20*a* to 20*l*) mounted on said insulation layer 19 so as to extend in a lateral or X direction; and three lines connected to the terminals A1, A2 and A3 respectively, each of which joins together any two of said fine electrodes 20*a* to 20*l* with the two other intervening electrodes left out. The first and second readout storage sections have the same arrangement as the image pickup section. As apparent from the sectional view of FIG. 5 on line 5—5 of FIG. 2, there are formed by diffusion on the surface of the semiconductor substrate 18 three insulating portion walls 21 (21*a* to 21*c*) extending in the Y direction. Numeral 34 denotes insulating partition walls running along both longitudinal edges of the image pickup device.

According to the embodiment of FIG. 2, there are arranged electrodes 20*a* to 20*l* and insulating portion walls 21*a* to 21*c* so as to provide four potential wells in the X direction and similar four wells with Y direction in matrix form. However, where this invention is to be applied to an actual television image pickup device, it is necessary to provide a sufficient number of electrodes and insulating partition walls so as to form potential wells in a large matrix arrangement in which there are disposed groups of about 300 wells in the X direction and groups of about 250 wells in the Y direction. In this case, each of the electrodes 21 need not be made into a single fine line to be mounted in common on such numerous potential wells, but it is possible to separate each lateral row of potential wells into a given number of divisions, use a plurality of shorter electrode lines for the respective divisions and electrically connected said electrode lines by proper means. The first and second readout storage sections 12 and 13 have the same arrangement as the image pickup section 11. Now, the electrodes of the first readout storage section 12 are collectively denoted by 22 and the terminals of the lines connected to said electrodes by B11, B12 and B13 respectively. The electrodes of the second readout storage section 13 are collectively indicated by 23 and the terminals of the lines connected to said electrodes by B21, B22 and B23 respectively.

Figure 6:
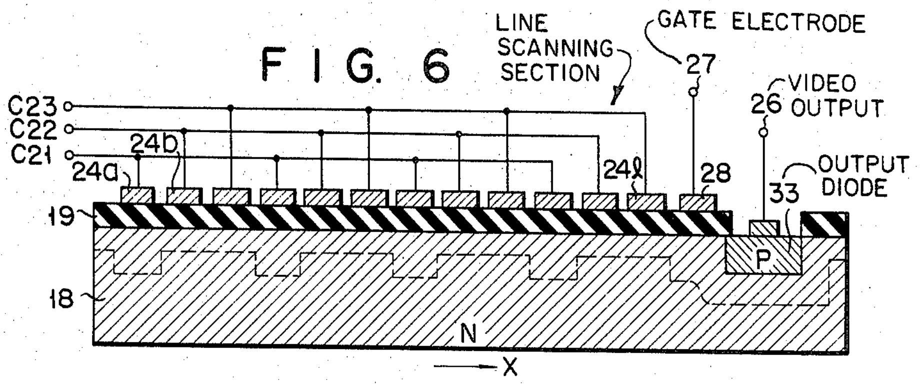
FIG. 6 is an enlarged sectional view on line 6—6 of FIG. 2.

As shown in the sectional view of FIG. 6 on line 6—6 of FIG. 2, the line scanning section of FIG. 2 comprises twelve electrodes 24 (24*a* to 24*l*) linearly arranged in the X direction. Every three electrodes as counted from the left to the right of FIG. 2 correspond to one potential well or picture element. At the indicated right end, the insulation layer 19 is etched off to provide a PN junction diode or output diode 33 to which there is connected an output terminal 26. A gate electrode 28 connected to a gate signal terminal 27 is intended to control the shifting to the P region of carriers travelling on the surface of the semiconductor substrate 18 in the indicated X direction. The terminals C21, C22 and C23 supplied with line scanning signals are connected to every two of said electrodes 24 (24*s* to 24*l*) with the two other intervening electrodes left out.

The first line scanning section 14 is arranged theoretically in the same manner as the second line scanning section 15. The only difference is that there is provided an insulation layer between the electrodes 29 of the first line scanning section 14 and the electrode 22*l* of the first readout storage section 12 so as to cause both electrodes 29 and 22*l* to intersect each other without any electrical contact. The terminals through which the electrodes 29 of said first line scanning section 14 are supplied with scanning signals are denoted by C11, C12 and C13. Each of these terminals is connected to every two of the group of the electrodes 29 with the two other intervening electrodes left out.

Referring to FIG. 3, let it be assumed that the terminals A1, A2 and A3 are impressed with three-phase voltage and that a capacitor of metal insulated silicon (MIS) defined by every three consecutive electrodes constitutes a unit element of the C.C.D. Assuming further that the terminals A3, A2 and A1 are impressed with voltages $Va$, $Vb$ and $Vc$ respectively. At $Va = -10V$ and $Vb = Vc = -1V$, there are formed potential wells, as illustrated by a broken line, in those portions of the surface of the semiconductor substrate which face the electrodes connected to the terminal A3. Where light is projected on the upper or under side of the semiconductor substrate in which there are thus formed potential wells, said wells are stored with carriers (or holes in the case of this embodiment). Where, under this condition, the voltage $Vb$ impressed on the terminal A2 is changed to a value of −20 volts with the values of the voltage $Va$ and $Vc$ applied to the terminals A3 and A1 kept unchanged, then the potential wells are made deeper, as illustrated by the broken line 32 of FIG. 4, causing the carriers stored below the electrodes connected to the terminal A3 to be shifted below the electrodes connected to the terminal A2. Where the voltage Va is made to have a value of −1 volt, the voltage $Vb$ −10 volts and the voltage Vc first −1 volt and later −20 volts, then the carriers are further shifted, as indicated by the arrows, to the regions below the respective adjacent electrodes connected to the terminal A2.

Figure 5:
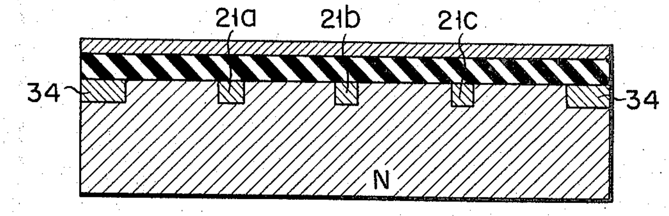
FIG. 5 is an enlarged sectional view on line 5—5 of FIG. 2.

Referring again to FIG. 2, the electrode lines 20*a* to 20*l* extend in the X direction, and there are formed, as illustrated in FIG. 5, on the surface of the semiconductor substrate the insulating portion walls 21*a*, 21*b* and 21*c* extending in the Y direction to prevent the diffusion of carriers in the X direction. Accordingly, where the terminals A1, A2 and A3 are impressed with the voltages whose values vary as described above, then the carriers stored in the potential wells arranged in matrix form can be shifted simultaneously in the Y direction for each row of picture elements. Namely, it is possible to effect frame scanning by projecting an optical image on the image pickup section after forming potential wells and simultaneously shifting in the Y direction for each row of picture elements the carriers stored in the potential wells in amounts varying with the intensity of light beams corresponding to the respective picture elements.

Figure 7:
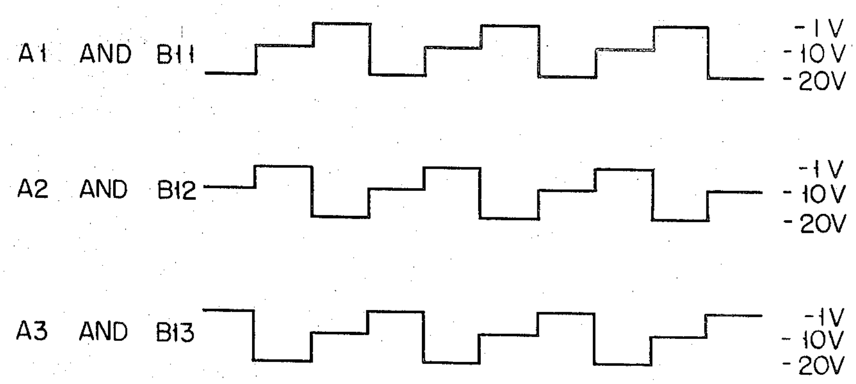
FIG. 7 illustrates the wave forms of voltage impressed on the terminals A1, A2, A3, B11, B12 and B13 when carriers from the image pickup section are shifted to the first readout storage section.

There will now be described by reference to FIG. 2 the case where there are to be simultaneously obtained a plurality of television signals. Though, in the foregoing embodiment, the potential wells are arranged, as previously described, in matrix form so as to match 4 × 4 picture elements and consequently can not produce practical television signals, yet the underlying principle will be fully understood. First, the terminals A1, A2 and A3 are impressed with voltages of −1 volt, −10 volts and −1 volt respectively so as to form potential wells in 4 × 4 matrix arrangement. Next, there is projected on the image pickup section an optical image of, for example, green (G) through a lens and a color separation optical system. At this time, the potential wells are stored with carriers corresponding to the respective picture elements to produce a charge image in the image pickup section. Then the terminals A1, A2 and A3 of the image pickup section 11 and the terminals B11, B12 and B13 of the first readout storage section 12 are impressed with voltages respectively bearing the wave forms shown in FIG. 7. As the result, the carriers stored in the image pickup section 11 are simultaneously shifted in the Y direction for each row of picture elements and are stored in the first readout section 12, completely extinguishing the charge image of the image pickup section 11 previously stored.

Figure 8:
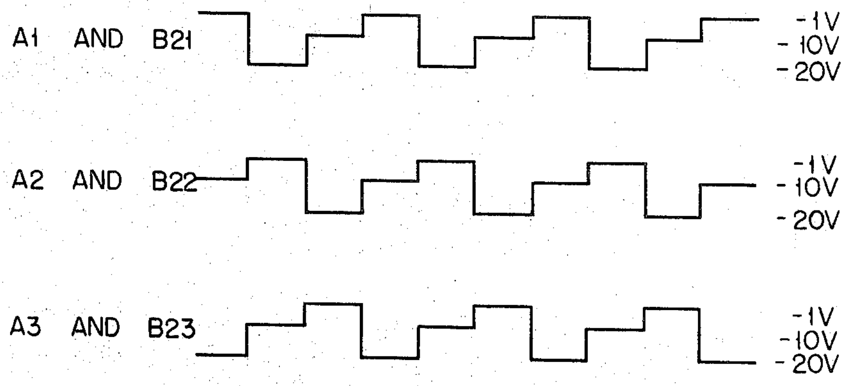
FIG. 8 indicates the wave forms of voltage impressed on the terminals A1, A2, A3, B21, B22 and B23 when carriers from the image pickup section are shifted to the second readout storage section.
Figure 9:
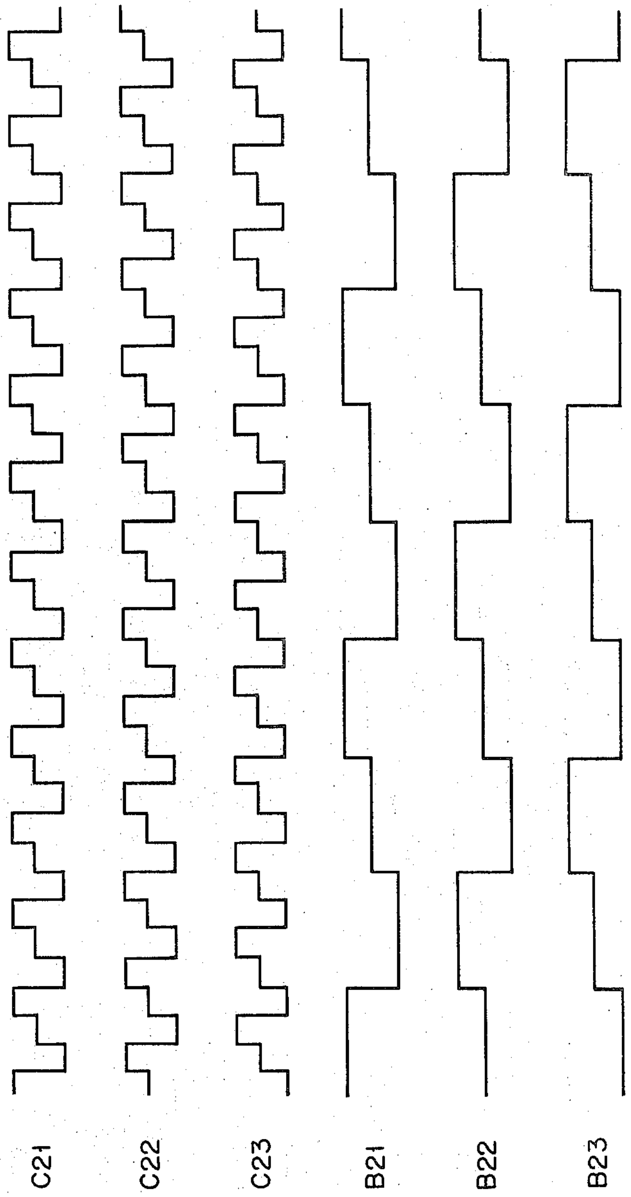
FIG. 9 shows the wave forms of voltage impressed on the terminals C21, C22, C23, B21, B22 and B23 when carriers are drawn out in the form of electrical signals from the second readout storage section.

Next, the terminals A1, A2 and A3 of the image pickup section 11 are impressed with voltages of −1 volt, −10 volts, and −1 volt respectively to form again potential wells. An optical image consisting of both red and blue colors is projected on the image pickup section 11 to obtain a charge image thereof. When the terminals A1, A2, A3, B21, B22 and B23 are impressed with voltages respectively bearing the wave forms indicated in FIG. 8, then the charge image bearing said red and blue color signals is conducted to the second readout storage section 13 so as to be stored therein. To obtain television signals from the charge images stored in the first and second readout storage sections 12 and 13, there should be carried out frame and line scanning operations in said sections with proper relationship maintained with each other. There will now be described these types of scanning with respect to the second readout storage section 13 and second line scanning section 15. The input signal terminals B21, B22 and B23 of the second readout storage section 13 and the input signal terminals C21, C22 and C23 of the line scanning section 15 are impressed with voltages bearing the wave forms presented in FIG. 9. As the result, the carriers are scanned in the X direction, as apparent from said wave forms, each time they are shifted in the Y direction, thereby producing television signals 17.

As seen from FIG. 6, the gate electrode 28, insulation layer 19, semiconductor substrate 18 and output diode 33 jointly constitute the same arrangement as that of an MOS transistor. Namely, the terminal 27 is impressed with gate voltage to produce a P channel on the surface of an N region, and there is drawn out an output signal from the diode 33 acting as the drain region of said MOS transistor. Withdrawal of said signal may be effected by not only the PN junction, but also Schottky barrier or variation of capacitance. To obtain television signals generally used at the present time, it is advised to set the frame scanning velocity at about 1/60 second, and the line scanning velocity at about 15.74 KHz. The first line scanning section has exactly the same function as the second one. Needless to say, television signals 16 and 17 can be obtained at the same time, if necessary. Though there was not made any reference to the method of simultaneously obtaining the red and blue signals in separate form where they are mixed together, the object may be attained by converting said mixture of red and blue signals into independent components in an electronic circuit, using any of the known processes such as phase division multiplex, frequency division multiplex and time division multiplex. Alternate projection of a plurality of optical images, (namely, an image of green signals and that of red and blue signals mixed together) may be effected by the known process.

Figure 10:
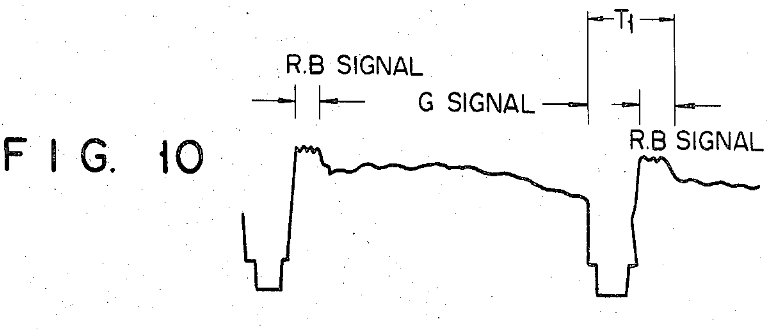
FIG. 10 indicates the wave form in which there are inserted time compressed signals into signals corresponding to an image using the pickup device shown in FIG. 2.

Control of the velocity of frame scanning and line scanning enables time-compressed signals to be easily obtained. Where there are to be transmitted color information signals, for example, during the blanking period T1, as shown in FIG. 10, then it is advised to carry out the line scanning of the first readout storage section 12 at the same velocity as used in a standard television appartus so as to obtain green signals and effect the line scanning of the second readout storage section 13 during the blanking period, for example, for 10 microseconds so as to obtain a time-compressed R.B. signals.

According to this invention, carriers stored in the image pickup section 11 are shifted in a short time to the two readout storage sections 12 and 13 alternately. When the image pickup section 11 is fully emptied of carriers, carriers corresponding to the succeeding optical image are stored in said image pickup section 11. Accordingly, the image pickup device according to the invention prevents the preceding and succeeding forms of information from overlapping each other as is often observed in an image pickup device using a storage type photoelectric converting element such as a vidicon.

In the foregoing embodiment there were used 3-phase stepped waves as a power source for shifting carriers. However, the number of phases may be changed to 2 or 4 etc. Further, the waves may have a saw-tooth or trapezoidal form, provided they meet the principle of the C.C.D.

What is claimed is:

1. A solid state image pickup device responsive to an optical image projected thereon, comprising:

an image pickup section having said image projected thereon and including means for inducing a plurality of potential wells in matrix arrangement in a semi-conductor substrate, said substrate being disposed to receive said optical image thereon, said image pickup section further comprising means for storing the potential wells with carriers corresponding to the picture elements of said optical image and means for shifting the carriers of a given row of wells in the longitudinal direction through the adjacent row of potential wells simultaneously for each row of potential wells;

first and second readout storage sections constructed with the same arrangement as the image pickup section and disposed on the portions of the semiconductor substrate longitudinally extending from both sides of said image pickup section so as to have the potential wells stored with the carriers shifted from the image pickup section in the longitudinal directions simultaneously for each row of picture elements; and first and second line scanning means positioned at one longitudinal end of the first and second readout storage sections so as to draw out the carriers stored in the potential wells of the corresponding readout storage sections so as to draw out the carriers stored in the potential wells of the corresponding readout storage sections in the form of electric signals in the order of the rows of picture elements.

2. The image pickup device according to claim 1 wherein the first and second optical images are alternately projected on the image pickup section, and said means for shifting alternately shifts the carriers stored in the image pickup section to the first and second readout sections.

3. The image pickup device according to claim 1 wherein said means for shifting shifts the carriers corresponding to the first and second optical images to the first and second readout storage sections respectively so as to be later simultaneously drawn out therefrom.

4. The image pickup device according to claim 1 wherein an optical image bearing color information is projected on the image pickup section, and said means for shifting shifts the corresponding carriers to at least either of said first and second readout storage sections so as to have the color information drawn out.

5. The image pickup device according to claim 1 wherein there is further provided means for effecting frame scanning and line scanning in a sufficiently short length of time to draw out time-compressed electric signals from at least either of said first and second readout storage sections.

* * * * *